United States Patent Office 2,793,973
Patented May 28, 1957

2,793,973

TREATMENT OF GARBAGE AND OTHER WASTES AND COMPOSITIONS THEREFOR

Nicholas D. Cheronis, Chicago, Ill.

No Drawing. Application September 10, 1949,
Serial No. 115,109

3 Claims. (Cl. 167—14)

My invention relates to the treatment of garbage and other wastes to inhibit bacterial decomposition thereof and development of objectionable odors therein and is also and particularly concerned with the production of new and useful sanitary lime compositions having particular efficacy for such purposes.

It is well known, for example, that garbage, whether stored in ordinary garbage cans or in dumps, develops offensive odors, particularly during the warm months, and these odors become more objectionable if the material stands over a period of at least several days. In general, collected garbage is ordinarily disposed of by either incineration, burial in trenches and covered by fill, or by dumping in open pits. In the latter two disposal procedures, offensive odors develop due to the formation of hydrogen sulfide, organic thiols and mercaptans. In addition, not infrequently, fecal odors also develop due, respectively, to the formation of skatols and related derivatives and to the formation of lower fatty acids. The exact types of odors which result depend, among other things, upon the nature of the garbage or other wastes, that is, whether they are primarily of protein origin, fatty character or the like, or mixtures of various types of organic matter. The quantities of objectionable or noxious gases which may develop under certain given conditions may be very considerable. Thus, for example, in one illustrative recent case, approximately 12,000 pounds of hydrogen sulfide were generated in a certain garbage dump during a period of 17 days and created a nuisance within a radius of 2 to 5 miles.

In addition to the methods described above for the treatment of garbage and similar wastes to inhibit the development of objectionable odors, it has been conventional practice to subject such wastes to contact with such products as lime which serves, at least in part, to inhibit fungal fermentation and bacterial decomposition. Other procedures heretofore suggested to attack the problem under discussion have involved the utilization of chlorinated aromatic hydrocarbons, a typical example of this latter approach being disclosed in United States Patent No. 1,996,353. All such prior efforts have, however, to my knowledge, left much to be desired in overcoming the serious problems arising from the handling and treatment of garbage and other wastes, particularly from the standpoint of efficacy and cost.

In accordance with one phase of my invention, new and highly useful hydrated "sanitary" lime products have been evolved which are exceptionally useful in the treatment of garbage and other wastes to inhibit bacterial decomposition and development of objectionable odors. The hydrated sanitary lime products of my invention contain minor proportions of a chlorinated aromatic hydrocarbon or a mixture of different chlorinated aromatic hydrocarbons, at least one member of the group consisting of anionic and non-ionic wetting agents, and at least one quaternary ammonium compound having a long chain alkyl radical, said quaternary ammonium compound being bactericidally or bacteriostatically active at a pH in excess of 8 and particularly at a pH in the range of approximately 10 to 12. The chlorinated aromatic hydrocarbons and the quaternary ammonium compounds coact together with the hydrated lime to produce the unusual results achieved by my invention as is set out hereafter. Other supplemental ingredients may be incorporated into the sanitary lime products of my invention as, for example, ferrous sulfate and DDT, but the use of these supplemental ingredients is not of critical significance. Sanitary lime products made in accordance with my invention are readily produced in the form of free-flowing, pulverulent compositions which may be shipped in conventional bags of the type heretofore utilized for the shipping of ordinary sanitary lime.

I have found that it is particularly advantageous, in the preparation of the sanitary lime products of my invention, to incorporate the quaternary ammonium compounds and the chlorinated aromatic hydrocarbons in the form of an emulsion. In this general connection, it may be noted that the quaternary ammonium compounds and the chlorinated aromatic hydrocarbons together readily form an emulsion without the necessity of the addition of extraneous emulsifying agents. However, when this emulsion is sought to be incorporated in an ordinary lime slurry, a dispersion results which precipitates rapidly and is sprayable only with considerable difficulty. Marked problems in incorporation also arise if the quaternary ammonium compounds and the chlorinated aromatic hydrocarbons are sought to be added separately to an ordinary lime slurry.

I have discovered, however, that if, during the hydration of the lime, a small proportion of anionic or non-ionic wetting agents or mixtures thereof is present, then the quaternary ammonium compounds and the chlorinated aromatic hydrocarbons are readily adsorbed by the hydrated lime. While it is particularly advantageous to incorporate the quaternary ammonium compounds and the chlorinated aromatic hydrocarbons in the form of an emulsion into the hydrated lime or lime slurry, it is not absolutely essential that this procedure be followed since said ingredients may be incorporated separately during the mixing stage. It is, however, essential that the incorporation take place in the presence of anionic or non-ionic wetting agents.

The following examples are illustrative of the manufacture of sanitary lime products made in accordance with my invention. It will be understood that various changes may be made with respect to the selection of particular quaternary ammonium compounds, chlorinated hydrocarbons and the like, variations may be made in proportions of ingredients, and other changes made in the light of the guiding principles disclosed herein without in any way departing from the essential aspects of my invention.

*Example 1*

To 800 pounds of unslaked lime, in a hydrator, a dispersion of 2 pounds of a commercial monostearin in approximately 220 pounds of water are added, with stirring, to effect hydration of the lime. To the resulting freshly hydrated lime, 20 pounds of ferrous sulfate are added with stirring and then there are admixed therewith 100 pounds of an emulsion prepared in the following manner: 12 pounds of trimethyloctadecenyl ammonium chloride are mixed with 16 pounds of water containing dissolved therein 4 ounces of sodium carbonate, the resulting mixture is stirred until the quaternary ammonium compound is dispersed, then 44 pounds of a mixture containing 60% dichlorobenzene and 40% chloronaphthalene are added slowly with stirring. (If DDT, for example, is to be added, it may be incorporated in amounts up to about 5% or 10% or more, based on the weight of the final product, by preliminarily dissolving it in the chlorinated aromatic hydrocarbons, or by adding the DDT in the form of a wettable DDT product containing about 50% DDT. The amount of DDT utilized is preferably such that, when the final product is diluted with water and used as a spray, it will leave a residue containing from 200 to 400 mg. of DDT per square foot of area sprayed.) The rate of the addition of the foregoing emulsion to the mixture of the hydrated lime and the ferrous sulfate is regulated so that no large lumps are formed. The small lumps which initially tend to form ultimately are broken down or pulverized by the agitator so that the final product represents a uniform, easily flowing powder which may readily be bagged.

*Example 2*

To 750 pounds of unslaked lime, in a hydrator, an aqueous dispersion is added, with stirring, said aqueous dispersion containing 200 pounds of water, 3 pounds monostearin, 10 pounds of trimethylhexadecyl ammonium chloride, and 40 pounds of dichlorobenzene. Stirring or agitation is carried out in the hydrator until hydration is completed and a pulverulent relatively uniform product is obtained.

*Example 3*

To 800 pounds of unslaked lime, in a hydrator, a solution of 3 pounds of lauryl sodium sulfate in 225 pounds of water is added, with stirring, to effect hydration of the lime. Thereupon, 100 pounds of an emulsion of trimethyloctadecenyl ammonium chloride and chlorinated aromatic hydrocarbons (prepared as described in Example 1) are gradually added and the mixture is agitated until a pulverulent product of relatively uniform character is obtained.

In use, approximately 50 pounds of the sanitary lime product may be dispersed in 100 to 200 gallons of water and sprayed on the garbage or other wastes disposed in garbage cans, garbage dumps, privies, chicken coops, or in any other environment where odors are prone to develop from exposure or standing of garbage or any equivalent wastes. For protective top layers, the spraying may be so carried out as to leave a deposit of about 2 to 4 g. of solids per square foot of area sprayed. It will be understood that the amount of the sanitary lime to be used in any given instance depends, among other things, on the amount of putrescible material present. Thus, for example, in one large scale operation, approximately 1 pound of the sanitary lime per cubic yard of garbage containing 50% to 60% putrescible matter was utilized during the summer months. In this operation, in which, during a period of 7 summer days, 4,000 cubic yards of garbage were dumped daily, the amount of hydrogen sulfide generated was slightly over 1% as against that amount generated prior to the use of my invention.

As I have previously stated, the quaternary ammonium compounds which are utilized must be of that type which retain their bactericidal or bacteriostatic properties at pH values in excess of 8 and particularly at pH values within the range of approximately 10 to 12. A number of these quaternary ammonium compounds are available, typical examples of which are trimethyldodecyl ammonium chloride, trimethylhexadecyl ammonium bromide, trimethyloctadecyl ammonium chloride, trimethyloctadecenyl ammonium chloride and, in general, quaternary ammonium compounds corresponding to the formula $R_1X_3NY$ wherein Y is halogen, particularly chlorine or bromine, X is a lower alkyl group such as methyl, ethyl, propyl and butyl, particularly methyl, and R is an alkyl radical or a mixture of alkyl radicals containing predominately from 12 to 18 carbon atoms. Other typical quaternary ammonium compounds which may be used in accordance with my present invention are alkoxy benzyl quaternary ammonium compounds which may be represented by the general formula

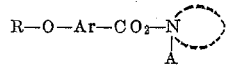

wherein R is an alkyl radical or a mixture of alkyl radicals containing from 12 to 18 carbon atoms, Ar is benzene or naphthalene, A is halogen, particularly chlorine or bromine, and the dotted circle attached to the N being the groups necessary to complete the quaternary ammonium radical of the molecule. Typical examples of such compounds are dodecyloxybenzyl trimethyl ammonium chloride and hexadecyloxybenzyl trimethyl ammonium chloride.

Among the chlorinated aromatic hydrocarbons which may be utilized in the practice of my invention are, for example, monochlorobenzene, p-dichlorobenzene, o-dichlorobenzene, p-chlorotoluene, o-chlorotoluene, monochloronaphthalene, dichloronaphthalene, and mixtures thereof in varying proportions. A particularly preferred mixture is one containing approximately 10% monochlorobenzene, approximately 40% o-dichlorobenzene, and approximately 50% of mixed chloronaphthalenes.

Any one or more of a large selection of anionic and non-ionic wetting agents may be utilized. In any event, it will be understood that such agents should be stable in alkaline media. Typical of suitable anionic wetting agents are the higher alkyl sulfates and sulfonates as, for example, lauryl sodium sulfate, lauryl sodium sulfonate, myristic sodium sulfate, cetyl sodium sulfate; mahogany sulfates; higher alkyl aryl sodium sulfonates wherein the alkyl radical contains from 12 to 16 carbon atoms, typical of such agents being those sold under the trade names "Oronite," "Nacconol NR," "Ultrawet," and the like. Among the non-ionic wetting agents are the higher fatty acid partial esters of aliphatic polyhydric alcohols, illustrative examples being ethylene glycol monostearate, diethylene glycol monopalmitate, monostearin, distearin, monopalmitin, stearic acid monoester of diglycerol, sorbitan monostearate, mannitan monostearate, sorbitan polyoxyethylene stearates, and the like. I prefer to use the non-ionic wetting agents and particularly satisfactory are mixed mono- and diglycerides derived from higher fatty acids, particularly predominately saturated fatty acids containing from 16 to 18 carbon atoms.

As has been pointed out hereinabove, various supplemental agents may be utilized if desired. I have referred, for example, to the use of ferrous sulfate and DDT. When ferrous sulfate is added to the lime and the slurry made, the ferrous sulfate changes to ferrous hydroxide and part of it is oxidized to ferric hydroxide in use. The ferrous or ferric ion serves as a precipitant for the hydrogen sulfide that may ge generated.

The proportions of the ingredients comprising the sanitary lime compositions made in accordance with my invention are, of course, subject to some variation. In all cases, the hydrated lime constitutes a major part of the composition and, in general, comprises from about 88.5% to about 96.4% of the entire product. The total quantity of the remaining ingredients ordinarily does not exceed approximately 10%. Thus, for example, the chlorinated aromatic hydrocarbons may comprise from about 2% to 6%, the anionic and/or non-ionic wetting agents may comprise from about 0.1% to about 0.5%, and the quaternary ammonium compounds may comprise from about 0.5% to about 2% or 3%. The ferrous sulfate and the DDT or other supplemental ingredients, if used, generally are employed in the range of approximately 1% to 3% or somewhat more or less, reference being made to the fact that, as pointed out above, DDT may, in certain cases, be present in materially greater proportions. Where, in the manufacture of the sanitary lime products of my invention, emulsions of the quaternary ammonium compounds and the chlorinated aromatic hydrocarbons are utilized, said emulsions comprise in general from about 2.5% to about 8% of the composition. An analysis of one illustrative sanitary line composition made in accordance with my invention showed approximately 93% hydrated lime, approximately 2% of quaternary ammonium compound, approximately 4% of chlorinated aromatic hydrocarbons, approximately 1% of ferrous sulfate, and approximately 0.1% of an anionic and/or non-ionic wetting agent.

What I claim as new and desire to protect by Letters Patent of the United States is:

1. In a method of making an improved sanitary lime, the steps which include effecting hydration of lime in the presence of a minor proportion of at least one wetting agent selected from the group consisting of anionic wetting agents and non-ionic wetting agents containing an aliphatic radical having from 12 to 18 carbon atoms, then admixing said hydrated lime with a minor proportion of an emulsion of (a) at least one chorinated aromatic hydrocarbon selected from the group consisting of mono- and di-chlorinated benzenes and mono- and di-chlorinated naphthalenes, and (b) a quarternary ammonium compound having a long chain alkyl radical and bactericidally active at a pH in excess of 8 and up to approximately 12, and agitating the mixture to produce a pulverulent product.

2. In a method of making an improved sanitary lime, the steps which include effecting hydration of lime in the presence of from about 0.1% to about 0.5% of at least one wetting agent selected from the group consisting of anionic wetting agents and non-ionic wetting agents containing an aliphatic radical having from 12 to 18 carbon atoms, then admixing said hydrated lime with a minor proportion of ferrous sulfate and an emulsion of (a) at least one chlorinated aromatic hydrocarbon selected from the group consisting of mono- and di-chlorinated benzenes and mono- and di-chlorinated naphthalenes and (b) a quaternary ammonium compound having a long chain alkyl radical and bactericidally active at a pH in excess of 8 and up to approximately 12, and agitating the mixture to produce a pulverulent product.

3. In a method of making an improved sanitary lime, the steps which include effecting hydration of lime in the presence of from about 0.1% to about 0.5% of at least one wetting agent selected from the group consisting of anionic wetting agents and non-ionic wetting agents containing an aliphatic radical having from 12 to 18 carbon atoms, then admixing said hydrated lime with from about 2.5% to about 8% of an emulsion of (a) at least one chlorinated aromatic hydrocarbon selected from the group consisting of mono- and di-chlorinated benzenes and mono- and di-chlorinated naphthalenes and (b) a quaternary ammonium compound having a long chain alkyl radical and bactericidally active at a pH in excess of 8 and up to approximately 12, and agitating the mixture to produce a pulverulent product.

References Cited in the file of this patent

UNITED STATES PATENTS

| | | |
|---|---|---|
| 486,172 | Wollheim | Nov. 15, 1892 |
| 1,863,990 | Nelson | June 21, 1932 |
| 1,887,623 | Laughlin | Sept. 13, 1932 |
| 1,918,555 | Partridge | July 18, 1933 |
| 1,980,986 | Windecker | Nov. 13, 1934 |
| 1,996,353 | Seydel | Apr. 2, 1935 |
| 2,046,242 | Bertsch | June 30, 1936 |
| 2,183,037 | Bayliss et al. | Dec. 12, 1939 |
| 2,446,793 | Shelton | Aug. 10, 1948 |
| 2,479,850 | Marks | Aug. 23, 1949 |
| 2,558,942 | Eagleson | July 3, 1951 |

FOREIGN PATENTS

| | | |
|---|---|---|
| 322,368 | Great Britain | Dec. 5, 1929 |
| 782,930 | France | Mar. 25, 1935 |